United States Patent [19]
Vittone

[11] Patent Number: 4,951,956
[45] Date of Patent: Aug. 28, 1990

[54] HAND GRIP FOR A WHEELBARROW

[76] Inventor: Larry W. Vittone, 309 Hannah Dr., Oliver Springs, Tenn. 37840

[21] Appl. No.: 345,440

[22] Filed: Apr. 28, 1989

[51] Int. Cl.$^5$ ............................................. B62B 1/20
[52] U.S. Cl. ......................... 280/47.31; 280/47.315; 298/3; 16/126; 16/127
[58] Field of Search ............ 280/653, 654, 655, 655.1, 280/47.31, 47.315, 47.32, 47.371; 272/143; 298/3; 403/113, 117; 16/112, 126, 127; D12/178; D21/198

[56] References Cited

U.S. PATENT DOCUMENTS

| | | | |
|---|---|---|---|
| 785,029 | 3/1905 | Vore | 280/655.1 X |
| 1,485,179 | 2/1924 | Funk | 280/47.31 |
| 2,901,263 | 12/1956 | Van Loon, Jr. | 280/47.31 |
| 3,173,705 | 11/1962 | De Graff Du Puy | 280/47.31 |
| 4,128,252 | 12/1978 | Raniero | 280/655 X |
| 4,629,184 | 12/1986 | Selkee | 272/123 |

FOREIGN PATENT DOCUMENTS

| | | | |
|---|---|---|---|
| 64822 | 2/1892 | Fed. Rep. of Germany | 280/47.31 |
| 2148208 | 5/1985 | United Kingdom | 280/47.31 |

*Primary Examiner*—Charles A. Marmor
*Assistant Examiner*—Brian L. Johnson
*Attorney, Agent, or Firm*—Luedeka, Hodges & Neely

[57] ABSTRACT

A hand grip assembly for a wheelbarrow handle shaft includes a handle having an elongate grip configured to be gripped by a hand along its length and along a grip axis. The handle is pivotally mounted on the handle shaft of the wheelbarrow for movement about a pivot axis which is oriented generally parallel to the support surface underlying the wheelbarrow and which is disposed closely adjacent to and generally perpendicular to the grip axis, approximately midway along the length of the grip.

11 Claims, 2 Drawing Sheets

HAND GRIP FOR A WHEELBARROW

BACKGROUND OF THE INVENTION.

This invention relates generally to wheelbarrows and relates more particularly to the handles of wheelbarrows.

Conventional wheelbarrows include a hopper supported on a pair of spread apart handle shafts. The shafts extend rearwardly of a front wheel to a location permitting a user to stand between the shafts for lifting and maneuvering the wheelbarrow.

Hand grips have been proposed for the handle shafts of wheelbarrows to accommodate a pivoting of handle shafts relative to the user's hands. This permits the wheelbarrow to be lifted up on its front wheel and emptied without requiring the user to change his grip. Examples of such hand grips are shown and described in U.S. Pat. Nos. 2,901,263 and 3,173,705.

It is an object of the present invention to provide a new and improved hand grip for a wheelbarrow handle shaft which accommodates a pivoting of the handle shaft relative to a hand positioned about the grip.

Another object of the present invention is to provide such a hand grip which promotes user comfort while the wheelbarrow is lifted or maneuvered.

Still another object of the present invention is to provide such a hand grip which facilitates the lifting and maneuvering of the wheelbarrow.

Yet another object of the present invention is to provide such a hand grip that is uncomplicated in construction and effective in operation.

A further object of the present invention is to provide a wheelbarrow within which a new and improved hand grip is incorporated.

SUMMARY OF THE INVENTION.

This invention resides in a hand grip assembly for a handle shaft of a wheelbarrow. The hand grip assembly includes a handle having an elongate grip configured to be gripped by a hand along its length and along a grip axis, and means for pivotally mounting the handle to the handle shaft to provide pivotal movement of the handle about a pivot axis which is oriented generally parallel to a support surface underlying the wheelbarrow, and which is disposed closely adjacent to and generally perpendicular to the grip axis, approximately midway along the length of the grip. As a result, the effort associated with manipulating the wheelbarrow during use, such as raising the wheelbarrow to dump a load of material, is considerably reduced.

DETAILED DESCRIPTION OF THE ILLUSTRATED EMBODIMENTS.

Figure 1:
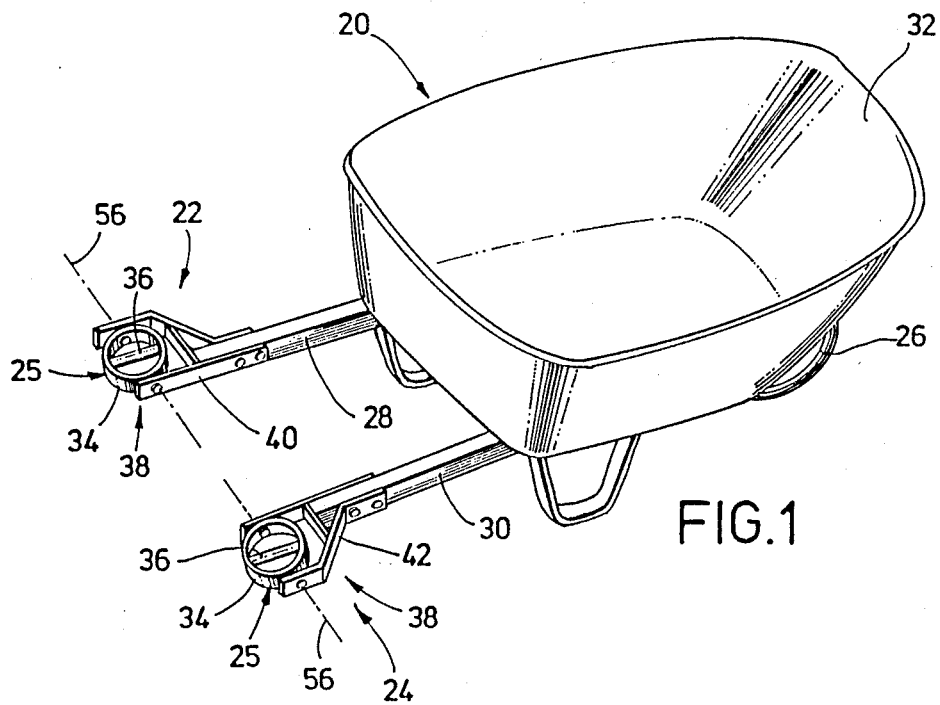
FIG. 1 is a perspective view illustrating attachment of a hand grip assembly constructed in accordance with the present invention to wheelbarrow.

Turning now to the drawings in greater detail and considering first FIG. 1, there is shown a wheelbarrow, generally indicated 20, to which hand grip assemblies 22, 24 incorporating features of a preferred embodiment of the invention have been attached. The wheelbarrow 20 includes a front wheel 26, a pair of spread apart handle shafts 28, 30 extending rearwardly of the front wheel 26, and a container body or hopper 32 supported across the shafts 28, 30 in a conventional manner.

The handle shafts 28, 30 have forward ends which converge to locations on opposite sides of the front wheel 26, and the front wheel 26 is journaled to the shafts 28, 30 in a manner permitting rotation of the wheel 26 about an axis oriented generally parallel to the underlying ground surface. The handle shafts 28, 30 also include rearward portions which are in a spaced relationship behind the container body 32 to permit a user to stand therebetween. As is described herein, the wheelbarrow shafts 28, 30 and container body 32 are pivoted about the front wheel 26 as the hand grip assemblies 22, 24 are raised and lowered.

Figure 2:
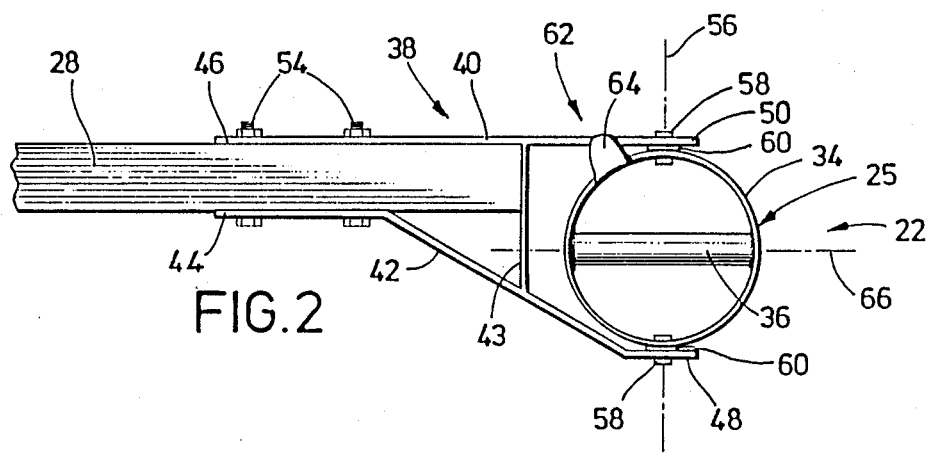
FIG. 2 is a fragmentary top plan view of the wheelbarrow and the attached hand grip assembly of FIG. 1.
Figure 3:
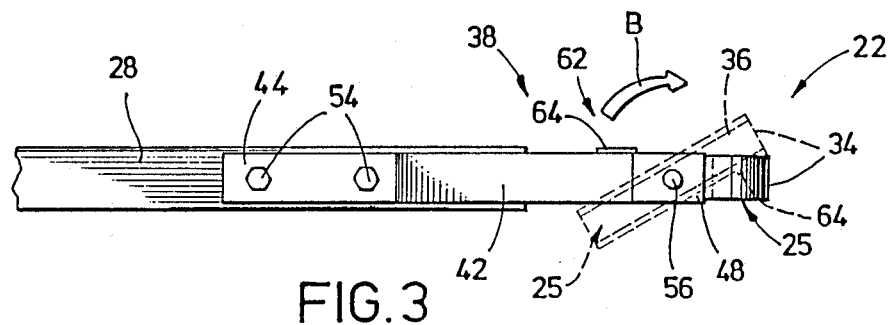
FIG. 3 is a side elevational view of the wheelbarrow and attached hand grip assembly shown in FIG. 2.

Turning to FIGS. 2 and 3, each hand grip assembly 22 or 24 includes handle means generally designated at 25. The handle means 25 is preferably provided by a rigid ring member 34 and an elongate rigid grip bar 36 attached to opposite sides of the ring member 34 so as to extend thereacross, preferably across its center.

The ring member 34 is relatively thin as measured between its inside and outside circumferential surfaces and has a circular opening which is large enough to accept the largest hand expected to be inserted therein for grasping the grip bar 36.

For manufacturing simplicity, the grip bar 36 is preferably cylindrical in shape and has a diameter such that when operatively grasped by a hand, the fingers of the hand comfortably encircle the surface of the bar 36 along a major portion of its length. If desired, the bar 36 may be contoured to provide fixed finger supporting surfaces. Each of the ring member 34 and grip bar 36 can be constructed, for example, of steel and are preferably permanently attached to one another by, for example, welds.

The ring member 34 of each assembly 22 or 24 is attached to a corresponding handle shaft 28 or 30 to permit the ring member 34 to pivot relative to the shaft 28 or 30 through a relatively broad range of movement. Each assembly 22 or 24 therefore includes pivotal mounting means, generally indicated 38, connected to the ring member 34 and attached to a corresponding handle shaft 28 or 30.

In a preferred embodiment, the mounting means 38 includes a substantially straight brace 40 located inside the handle shaft and a somewhat Z-shaped brace 42 located outside the shaft. As shown in FIGS. 2 and 3, the braces 40 and 42 are positioned adjacent opposite outside circumferential surfaces of the ring member 34 and are disposed in a substantially planar arrangement.

A cross-bar 43 is welded or otherwise fixedly attached between the braces 40 and 42 approximately perpendicular to the brace 40. The bar 43 thus permanently attaches the braces 40 and 42 together to form a unitary assembly, and also functions as a stop against which the end of the handle shaft 28 or 30 is abuttingly engaged when the assembly 22 or 24 is attached to the shaft.

The brace 42 has forward and rearward ends 44 and 48, respectively, and the brace 40 has forward and rearward ends 46 and 50, respectively. The forward ends 44 and 46 of the braces 42 and 40 are generally parallel, and are fixedly attached to opposite sides of shafts 28, 30 by means of bolts 54 which extend through aligned apertures provided in the ends 44 and 46 and through corresponding apertures provided in the shafts.

The rearward ends 50, 48 of the braces 40 and 42 are arranged in a spaced relationship to accommodate the ring member 34 therebetween which in a preferred embodiment, is accomplished by providing bends in the brace 42 so that it has the aforementioned Z-shape. Each of the braces 40 and 42 is constructed a suitably rigid material, such as steel.

It is noted that with most conventional wheelbarrows, the handle shafts 28 and 30 are made of wood and have a square or rectangular cross-section along most of their length. However, they are usually rounded along a short distance adjacent their outboard ends to facilitate gripping. It is preferred in such cases to cut off the rounded positions of the handle shafts so that the ends of the shafts are square and so that the shafts have flat sides onto which the braces 40 and 42 may be attached. Typically, only a relatively short length of the shaft need be removed, 6 to 8 inches, for example, and the resulting position of the bar 36 relative to the shaft puts the user's hands in approximately the same position with regard to the shaft and the hopper 32 as it would have been gripping the shafts before their ends are cut off.

With continuing reference to FIGS. 2 and 3, the ring member 34 is positioned within the spacing defined between the rearward ends 48, 50 of the braces 42 and 40 and is pivotally attached to the ends 48 and 50 for pivotal movement about a pivot axis 56. The pivotal attachment of the ends 48 and 50 to the ring member 34 is provided by short bolts 58 whose shanks extend through aligned openings provided in opposite sides of the ring member 34 and in ends 48 and 50. To reduce friction between the ring member 34 and the corresponding end 48 or 50, a washer 60 is positioned between each end 48 or 50 and its corresponding side of the ring member 34.

As mentioned earlier, the pivotal connection provided by the mounting means 38 permits the ring member 34 to pivot about the pivot axis 56. One such pivotal movement of the ring member 34 is illustrated by the direction of the arrow B (FIG. 3) from a position as illustrated in solid lines in FIG. 3 through a range of angular displacement to a condition such as is illustrated in phantom in FIG. 3.

In order that the wheelbarrow 20 may be pushed most effectively during some wheelbarrow-pushing operations, such as operations requiring that the wheelbarrow 20 be pushed through mud or up a ramp, it is desirable that the ring member 34 not be permitted to pivot in a manner permitting the rear of the grip bars 36 move upwardly and forwardly from the FIG. 3 solid-line position.

To this end, each assembly 22 or 24 further includes movement limiting means, indicated at 62, for limiting the movement of the ring member 34 in one pivotal direction about the pivot axis 56. In the depicted assembly embodiments, the movement limiting means 62 includes a stop member in the form of a metal tab 64 welded or otherwise attached atop the ring member 34 so as to engage the top surface of the brace 40.

The tab 64 cooperates with the bar 40 to prevent rotation of the ring member 34 from the FIG. 3 solid-line position in a counter-clockwise direction as viewed in FIG. 3. In other words, as the ring member 34 is urged in a pivotal direction that would normally move the rear of the grip bar 36 upwardly and forwardly from the FIG. 3 solid-line position, the tab 64 abuttingly engages the brace 40 to limit the movement of the ring member 36 beyond the FIG. 3 solid-line position.

Referring now to FIG. 2, it will be appreciated that the ring member 34 is disposed between the brace ends 48 and 50 so that the longitudinal or grip axis 66 of the grip bar 36 is closely adjacent to and generally perpendicular to the pivot axis 56, about midway along the length of the bar 36. Most preferably, and as shown in the figures, the longitudinal axis of the grip bar 36 intersects the pivot axis 56 at a right angle. Moreover, it is seen that the grip bar 36 is arranged generally parallel to and is contained in the plane formed by the braces 40 and 42, as shown in FIG. 3. And the grip axis 66 of the grip bar 36 is also generally parallel to the plane containing the longitudinal axis of the handle shafts 28 or 30.

When the assemblies 22, 24 are operatively attached to the sides of the wheelbarrow handle shafts 28 and 30 as illustrated in FIG. 1, each pivot axis 56 is oriented generally parallel to the support surface underlying the wheelbarrow. Such a disposition of each pivot axis 56 permits the corresponding grip bar 36 to pivot or rotate in a plane oriented generally perpendicular to the underlying surface.

Figure 4:
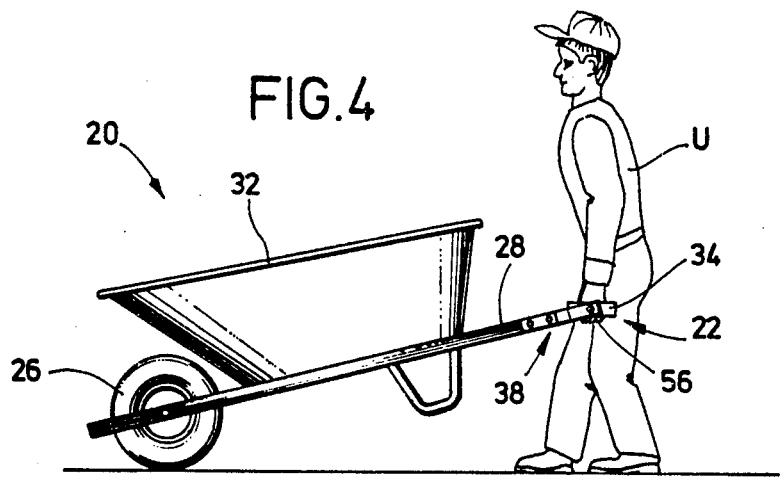
FIG. 4 is a side elevation view illustrating use of the wheelbarrow and attached hand grip assembly shown in FIGS. 1 through 3.
Figure 5:
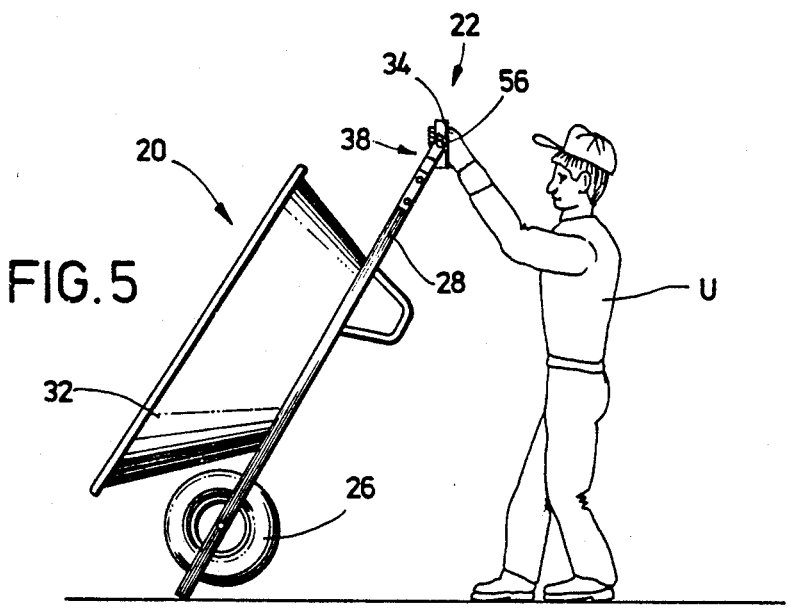
FIG. 5 is a view similar to that of FIG. 4 illustrating the wheelbarrow being turned upon its front wheel.

Use of the hand grip assemblies 22, 24 is illustrated in FIGS. 4 and 5 which show a user U standing generally between the wheelbarrow handle shafts 28 and 30 grasping the grip bars 36. In order to transport a load of material contained in the hopper 32, the user U lifts up on the grip bars 36 to raise the rearward portions of the handle shafts 28 and 30, causing the front ends of the shafts to the pivot about the front wheel 26.

As the rearward portions of the handle shafts 28 and 30 are raised, each grip bar 36 is permitted to pivot about its pivot axis 56. Therefore, as the grip bars 36 are raised to a level, as shown in FIG. 4, at which the wheelbarrow 20 is normally pushed, the grip bars 36 may be maintained in an advantageous parallel relationship with the underlying ground surface with no extra effort. Hence, it is believed that the capacity of each ring member 34 to pivot about its pivot axis 56 accommodates the positioning of the grasping hand in a relatively comfortable position during a wheelbarrow lifting and moving operation.

Furthermore, if is desired that the wheelbarrow 20 be turned up on its front wheel 26 in the manner illustrated in FIG. 5 to dump a load of material from the hopper 32, the ring members 34 permit the grip bars 36 to be lifted to the necessary height without requiring that the user's grip on the wheelbarrow be changed and with a minimum of effort. When lifting the wheelbarrow 20 as aforedescribed, the grip bars 36 may be pivoted from at or slightly above the FIG. 3 solid-line position to about the FIG. 3 phantom-line condition. It follows that as the wheelbarrow 20 is returned from its raised, FIG. 5 position, to the position shown in FIG. 4, the grip bars 36 pivot from the FIG. 3 phantom-line condition to about or slightly above the FIG. 3 solid-line condition.

One advantage provided by the hand grip assemblies 22, 24 relates to the disposition of the pivot axis 56 relative to the corresponding grip axis 66 of the grip bar 36. More specifically, as mentioned above, the grip axis 66 of each grip bar 36 is disposed closely adjacent to and generally perpendicular to the corresponding pivot axis 56, and preferably in fact intersects the pivot axis 56 at a right angle, so that when the grip bars 36 are operatively grasped, the grasping hands are intersected by the pivot axes 56. Such a disposition between the pivot axes 56 and the grasping hands is believed to reduce the likelihood that the user's wrist will be unduly contorted or strained while maneuvering the wheelbarrow 20.

Another advantage provided by the assemblies 22 and 24 relates to the disposition of the grip bars 36 relative to the handle shafts 28, 30. In this connection and as exemplified by the grip bar 36 of the FIG. 2 embodiment of the assembly 22, the grip axis 66 of each grip bar 36 is slightly offset to and positioned outboard of the shafts 28 and 30. By positioning the grip bars 36 relative to the handle shafts 28, 30 as aforedescribed, any twisting torque which may otherwise be exerted upon the assemblies 22, 24 as the grip bars 36 are lifted is minimized while the structure of the assemblies 22, 24 is retained substantially outside of the space between the handle shafts so as not to interfere with the user's accustomed walking and lifting movements.

Figure 6:
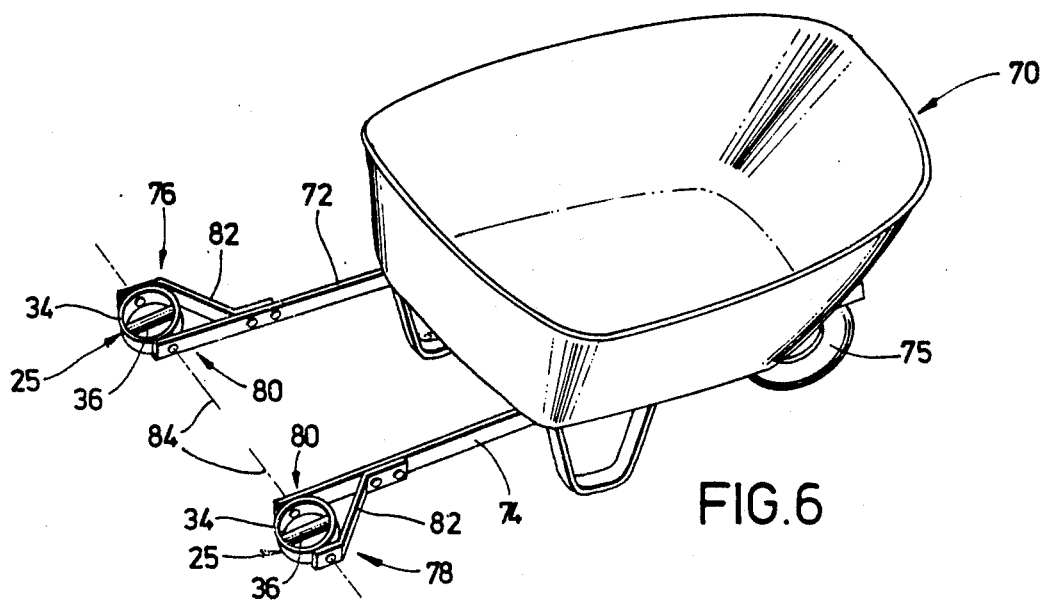
FIG. 6 is a fragmentary perspective view of a wheelbarrow within which hand grips are incorporated.

It will be understood that numerous modifications and substitutions may be made to the aforedescribed embodiments without departing from the spirit and scope of the invention. For example, although in the aforedescribed embodiments the assemblies 22, 24 have been shown and described in the nature of add-on devices for attachment to the handle shafts of a conventional wheelbarrow, it will be appreciated that an assembly constructed in accordance with this invention may be provided as an original part of a wheelbarrow handle shaft. For example, there is illustrated in FIG. 6, a wheelbarrow 70 having a pair of handle shafts 72, 74 extending rearwardly from a front wheel 75 and hand grip assemblies 76, 78 associated with the shafts 72 and 74, respectively. Each hand grip assembly 76 or 78 includes a ring member 34, a grip bar 36 and mounting means 80 pivotally connecting the ring member 34 to the corresponding handle shaft 72 or 74.

In the depicted wheelbarrow 70, the mounting means 80 include a brace member 82 fixed directly to the outboard side of a corresponding handle shaft 72 or 74. The brace 82 has a rearward portion which is spaced from the handle shaft 72 or 74 to accommodate the positioning of the ring member 34 between the shaft 72 or 74 and brace 82.

The ring member 34 is pivotally connected between the shaft 72 or 74 and brace 82 in a manner permitting pivotal movement of the ring member 34 about a substantially horizontal axis 84 in the manner described above with reference to FIGS. 1 through 5. Accordingly, the aforedescribed embodiments are intended for purposes of illustration and not as limitation.

What is claimed is:

1. A hand grip assembly for a handle shaft of a wheelbarrow comprising:
   handle means having a generally straight, elongate grip having opposite ends configured to be gripped by a hand along a length thereof and along a grip axis which generally coincides with the longitudinal axis of said elongate grip;
   means for pivotally mounting said handle means to the handle shaft of the wheelbarrow to provide pivotal movement of said handle means about a pivot axis which is continuously disposed generally transversely of the wheelbarrow handle shaft and parallel to a support surface underlying the wheelbarrow and which is disposed generally orthogonal to so as to intersect said grip axis approximately midway along the length of said elongated grip between the opposite ends thereof so that when the hand of a user grips the elongate grip, the pivot axis intersects the palm of the hand so that when lifting and lowering the wheelbarrow shaft with a hand grasped about the elongate grip, the handle means is permitted to pivot relative to the wheelbarrow shaft to accommodate movement of the grasping hand into a desired angular orientation relative to the handle shaft.

2. The hand grip assembly as defined in claim 1 wherein said handle means comprises a ring and said grip comprises an elongated bar attached to opposite sides of the ring so as to extend across the center of the ring.

3. The hand grip assembly as defined in claim 1 wherein the handle shaft of the wheelbarrow includes a generally straight portion with which the assembly is associated, said grip comprises an elongate bar, and said means for pivotally mounting is adapted to pivotally support said handle member so that said elongate bar pivots in a plane that is closely adjacent to the longitudinal axis of the straight portion of the wheelbarrow handle shaft.

4. A hand grip assembly for a handle shaft of a wheelbarrow comprising:
   a handle member having an opening dimensioned to receive a hand therein;
   means for pivotally mounting said handle member to the handle shaft of the wheelbarrow to provide pivotal movement of the handle member abut a pivot axis extending across said opening of said handle member and continuously oriented transversely of the wheelbarrow handle shaft and generally parallel to a support surface underlying the wheelbarrow; and
   an elongate grip having opposite ends provided on said handle member configured to be gripped by a hand along a length thereof and along a grip axis which generally coincides with the longitudinal axis of said elongate grip, the longitudinal axis of said elongate grip being oriented generally perpendicular to and intersected by said pivot axis approximately midway along the length of the elongate grip between the opposite ends thereof so that when the hand of a user grips the elongate grip, the pivot axis intersects the palm of the hand so that when lifting and lowering the wheelbarrow shaft with a hand grasped about the elongate grip, the handle means is permitted to pivot relative to the wheelbarrow shaft to accommodate movement of the grasping hand into a desired angular orientation relative to the handle shaft.

5. The hand grip assembly as defined in claim 4 wherein said elongategrip comprises an elongate bar having twoopposite ends which are attached to opposite sides of said opening of said handle member, and said pivot axis intersects the longitudinal axis of said elongate bar at a location substantially midway between the opposite ends of said elongate bar.

6. The hand grip assembly as defined in claim 4 wherein the handle shaft of the wheelbarrow includes a generally straight portion with which the assembly is associated, said elongate grip comprises a grip bar that is elongated in shape, and said means for pivotally mounting is adapted to pivotally support said handle member so that the longitudinal axis of said grip bar pivots in a plane that is closely adjacent to the longitudinal axis of the straight portion of the wheelbarrow handle shaft.

7. The hand grip assembly as defined in claim 4 wherein the handle shaft of the wheelbarrow includes a generally straight portion with which the assembly is associated, and said means for pivotally mounting is adapted to support said handle member so that said pivot axis intersects the longitudinal axis of the straight portion of the wheelbarrow handle shaft.

8. The hand grip assembly as defined in claim 4 further comprising means for limiting the pivotal movement of said handle member in at least one pivotal direction about said pivot axis.

9. A hand grip assembly for a handle shaft of a wheelbarrow including two handle shafts having straight portions which are spaced from one another and which extend rearwardly of the wheelbarrow, said assembly comprising:

a handle member having an opening dimensioned to receive a hand therein;

means for pivotally mounting said handle member to a handle shaft of the wheelbarrow to provide pivotal movement of the handle member about a pivot axis extending across said opening of said handle member and continuously oriented transversely of the wheelbarrow handle shaft and generally parallel to a support surface underlying the wheelbarrow; and an elongate grip provided on said handle member and configured to be gripped by a hand along a length thereof and along a grip axis which generally coincides with the longitudinal axis of said elongate grip, the longitudinal axis of said elongate grip being oriented generally perpendicular to and intersected by said pivot axis so that when the hand of a user grips the elongate grip, the pivot axis intersects the palm of the hand so that when lifting and lowering the wheelbarrow shaft with a hand grasped about the elongate grip, the handle means is permitted to pivot relative to the wheelbarrow shaft to accommodate the movement of the grasping hand into a desired angular orientation relative to the handle shaft; and said means for pivotally mounting is adapted to support said handle member adjacent one of the handle shaft so that said elongate grip is positioned slightly outboard of the longitudinal axes of the straight portions of the wheelbarrow handle shafts.

10. A hand grip assembly for a handle shaft of a wheelbarrow comprising:

a handle member having an opening dimensioned to receive a hand therein;

means for pivotally mounting said handle member to the handle shaft of the wheelbarrow to provide pivotal movement of the handle member about a pivot axis extending across said opening of said handle member and continuously oriented transversely of the wheelbarrow handle shaft and generally parallel to a support surface underlying the wheelbarrow; and an elongate grip provided on said handle member and configured to be gripped by a hand along a length thereof and along a grip axis which generally coincides with the longitudinal axis of said elongate grip, the longitudinal axis of said elongate grip being is oriented generally perpendicular to and intersected by said pivot axis so that when the hand of a user grips the elongate grip, the pivot axis intersects the palm of the hand so that when lifting and lowering the wheelbarrow shaft with a hand grasped about the elongate grip, the handle means is permitted to pivot relative to the wheelbarrow shaft to accommodate the movement of the grasping hand into a desired angular orientation relative to the handle shaft; and said handle member comprises a generally planar ring defining said opening thereacross and said means for pivotally mounting is adapted to support said ring so that said pivot axis passes across said opening of said ring and intersects opposite sides of the ring.

11. In combination with a wheelbarrow including a container body, and a pair of handle shafts extending generally rearwardly from the container body, handle means having an elongate, generally straight grip having opposite ends configured to be gripped by a hand along a length thereof and along a grip axis which coincides with the longitudinal axis of said elongate grip, and means for pivotally mounting said handle means to the handle shaft of the wheelbarrow to provide pivotal movement of said handle means about a pivot axis which is continuously oriented generally transversely of the wheelbarrow and parallel to a support surface underlying the wheelbarrow and which is disposed generally orthogonal to so as to intersect said grip axis approximately midway along the length of said elongate grip between the opposite ends thereof so that when the hand of a user grips the elongate grip, the pivot axis intersects the palm of the hand so that when lifting and lowering the wheelbarrow shaft with a hand grasped about the elongate grip, the handle means is permitted to pivot relative to the wheelbarrow shaft to accommodate movement of the hand into a desired angular orientation relative to the handle shaft when lifting and lowering the shaft.

* * * * *